US012532158B2

(12) United States Patent
Al-Dulaimi et al.

(10) Patent No.: US 12,532,158 B2
(45) Date of Patent: Jan. 20, 2026

(54) SYSTEMS AND METHODS FOR ASSOCIATING SUPI AND SUCI IN 5G NETWORKS

(71) Applicant: EXFO OY, Oulu (FI)

(72) Inventors: Anwer Al-Dulaimi, Montreal (CA); Stéphane Michel Boulet, Châteaugiron (FR); Jad Alouani, Rennes (FR); Manuel Cissé, Chanteloup (FR); Choua Yang, Betton (FR); Guillaume Ernot, Paimpol (FR)

(73) Assignee: EXFO OY, Oulu (FI)

( * ) Notice: Subject to any disclaimer, the term of this patent is extended or adjusted under 35 U.S.C. 154(b) by 471 days.

(21) Appl. No.: 17/944,266

(22) Filed: Sep. 14, 2022

(65) Prior Publication Data

US 2023/0396985 A1 Dec. 7, 2023

Related U.S. Application Data

(60) Provisional application No. 63/390,657, filed on Jul. 20, 2022, provisional application No. 63/354,971, (Continued)

(51) Int. Cl.
*H04W 4/00* (2018.01)
*H04W 8/20* (2009.01)
*H04W 12/80* (2021.01)

(52) U.S. Cl.
CPC ............ *H04W 8/20* (2013.01); *H04W 12/80* (2021.01)

(58) Field of Classification Search
CPC ..... H04W 12/02; H04W 12/03; H04W 12/80; H04W 8/20; H04W 76/00; H04W 12/72
See application file for complete search history.

(56) References Cited

U.S. PATENT DOCUMENTS 9,247,430 B2 1/2016 Kountouris et al.
11,206,205 B1 12/2021 Gupta et al.
(Continued)

FOREIGN PATENT DOCUMENTS

CN 113316948 A 8/2021
EP 3 573 304 B1 3/2022
(Continued)

OTHER PUBLICATIONS

Gholami Reza: "5G SUPI and SUCI Identifiers", Apr. 3, 2020 (Apr. 3, 2020), XP093047974, Retrieved from the Internet: URL:https://www.linkedin.com/pulse/5g-supi-suci-identifiers-reza-gholami [retrieved on May 18, 2023].

(Continued)

*Primary Examiner* — Shantell L Heiber
(74) *Attorney, Agent, or Firm* — Baratta Law PLLC; Lawrence A. Baratta, Jr.

(57) ABSTRACT

Systems and methods for detecting a subscriber permanent identifier (SUPI) from a subscriber concealed identifier (SUCI) include steps of receiving the SUCI that is a representative of user equipment (UE) of interest and that is encrypted; checking association data with the received SUCI to determine a corresponding SUPI, wherein the association data includes a mapping of a plurality of SUCIs to a plurality of SUPIs and is maintained over time based on monitoring messages in a 5G core network; and providing the corresponding SUPI. The steps can further include updating the association data based on monitoring exchanges on both sides of an access and mobility management function (AMF) associated with the 5G core network.

18 Claims, 17 Drawing Sheets

Related U.S. Application Data filed on Jun. 23, 2022, provisional application No. 63/349,842, filed on Jun. 7, 2022.

(56) References Cited

U.S. PATENT DOCUMENTS

| | | | |
|---|---|---|---|
| 11,265,699 B2* | 3/2022 | Targali | H04L 9/3236 |
| 2016/0295398 A1* | 10/2016 | Ketheesan | H04W 24/08 |
| 2021/0021993 A1 | 1/2021 | Yang et al. | |
| 2021/0092603 A1* | 3/2021 | Yang | H04L 9/0844 |
| 2021/0219137 A1* | 7/2021 | S Bykampadi | H04L 63/166 |
| 2021/0409942 A1* | 12/2021 | De Kievit | H04W 8/18 |
| 2022/0039003 A1* | 2/2022 | Castellanos Zamora | H04W 8/20 |
| 2022/0248221 A1* | 8/2022 | Nix | H04W 12/02 |
| 2022/0264509 A1* | 8/2022 | Song | H04W 48/16 |
| 2022/0386104 A1* | 12/2022 | Chaugule | H04W 12/40 |
| 2023/0308866 A1* | 9/2023 | Yan | H04W 12/02 |
| 2023/0379696 A1* | 11/2023 | Kuravangi-Thammaiah | H04W 12/02 |
| 2024/0064847 A1* | 2/2024 | Tiwari | H04W 76/20 |
| 2024/0187968 A1* | 6/2024 | Tiwari | H04W 8/20 |
| 2024/0373233 A1* | 11/2024 | Maione | H04L 63/306 |

FOREIGN PATENT DOCUMENTS

| | | |
|---|---|---|
| KR | 20210024597 A | 3/2021 |
| WO | 2021/151497 A1 | 8/2021 |
| WO | 2022087947 A1 | 5/2022 |
| WO | 2022132146 A1 | 6/2022 |

OTHER PUBLICATIONS

3gpp Tsg Ct Wg4 Meeting #85: "Changed length and mapping of SGS Temporary Identifiers", May 25, 2018 (May 25, 2018), XP093048638, Osaka, Japan Retrieved from the Internet: URL:https://portal.3gpp.org/ChangeRequests.aspx?q=1&workitem=750025&rgCrListChangePage=46_200 [retrieved on May 22, 2023].

Anonymous: "5G Subscriber Identifiers—SUCI & SUPI—Nick vs Networking", Nov. 28, 2020 (Nov. 28, 2020), XP93048639, Retrieved from the Internet: URL:https://web.archive.org/web/20210125013419/https://nickvsnetworking.com/5g-subscriber-identifiers-suci-supi/ [retrieved on May 22, 2023].

Gholami Reza: "5G SUPI and SUCI Identifiers", Apr. 3, 2020 (Apr. 3, 2020), XP093047974, Retrieved from the Internet: URL:https://www.linkedin.com/pulse/5g-supi-suci-identifiers-reza-gholami [retrieved on Jun. 13, 2023].

* cited by examiner

SYSTEMS AND METHODS FOR ASSOCIATING SUPI AND SUCI IN 5G NETWORKS

CROSS-REFERENCE TO RELATED APPLICATION(S)

The present disclosure claims priority to U.S. Provisional Patent Application Nos. 63/349,842, 63/354,971, and 63/390,657, filed on Jun. 7, 2022, Jun. 23, 2022, and Jul. 20, 2022, respectively, and the contents of which are incorporated by reference in their entirety.

FIELD OF THE DISCLOSURE

The present disclosure relates generally to wireless networking. More particularly, the present disclosure relates to international mobile subscriber identity (IMSI) catchers, and, more particularly, to a subscriber permanent identifier (SUPI) catcher for use in 5G networks which associates SUPI and subscriber concealed identifier (SUCI).

BACKGROUND OF THE DISCLOSURE

An IMSI Catcher is an eavesdropping device used for intercepting mobile phone traffic and tracking location data of mobile phone users. In 4G, when user equipment (UE) initially attaches to a long-term evolution (LTE) network (e.g., turning on the UE), it sends its IMSI to the network for authentication to have itself identified. One can therefore associate a mobile phone user to its IMSI and track the IMSI activity in the network traffic to obtain location data for the user.

In 5G networks the IMSI is replaced by a subscription permanent identifier (SUPI) that is also a representative value for the UE. However, 5G users do not send the SUPI in clear mode but rather send an encrypted value known as subscriber concealed identifier (SUCI), as defined in 3GPP TS 33.501 (see, e.g., Security architecture and procedures for 5G System, 3GPP TS 33.501 version 16.3.0 Release 16, August 2020, the contents of which are incorporated by reference in their entirety). This makes it very complicated for catchers to find the right user identifier especially since the SUCI could change at any time due to a refreshing parameter embedded in the encryption mechanism.

There is therefore a need for an IMSI/SUPI catcher for use in 5G networks.

BRIEF SUMMARY OF THE DISCLOSURE

The present disclosure relates to systems and methods for international mobile subscriber identity (IMSI) catchers, and, more particularly, to a subscriber permanent identifier (SUPI) catcher for use in 5G networks which associates SUPI and subscriber concealed identifier (SUCI). Systems and methods for detecting a subscriber permanent identifier (SUPI) from a subscriber concealed identifier (SUCI) include steps of receiving the SUCI that is a representative of user equipment (UE) of interest and that is encrypted; checking association data with the received SUCI to determine a corresponding SUPI, wherein the association data includes a mapping of a plurality of SUCIs to a plurality of SUPIs and is maintained over time based on monitoring messages in a 5G core network; and providing the corresponding SUPI. The steps can further include updating the association data based on monitoring exchanges on both sides of an access and mobility management function (AMF) associated with the 5G core network.

In various embodiments, the present disclosure includes a method having steps, a processing device with memory storing instructions that, when executed, cause one or more processors to perform the steps, and/or non-transitory computer-readable medium with instructions that, when executed, cause one or more processors to perform the steps. The steps include receiving the SUCI that is a representative of user equipment (UE) of interest and that is encrypted; checking association data with the received SUCI to determine a corresponding SUPI, wherein the association data includes a mapping of a plurality of SUCIs to a plurality of SUPIs and is maintained over time based on monitoring messages in a 5G core network; and providing the corresponding SUPI.

The steps can further include updating the association data based on monitoring one or more of i) exchanges on both sides of an access and mobility management function (AMF) associated with the 5G core network and ii) on communication between unified data management (UDM) and an authentication server function (AUSF). A SUCI changes for a corresponding SUPI based on any changes in associated encryption. The monitoring exchanges can be via a probe that captures data on the both sides of the AMF and via identifying specific messages on a message bus configured to receive the exchanges from the probe. The monitoring exchanges can include capturing raw frames, stream processing the raw frames, and identifying events via the stream processing. The monitoring exchanges can include identifying the mapping based on correlating a hypertext transfer protocol 2 (HTTP/2) request and response. The monitoring exchanges can include identifying the mapping based on a presence of a specific key in a response. The monitoring exchanges can include monitoring events in a stream processing system connected to one or more probes in the 5G core network. The updating can be based on enrichment events caused in the stream processing system based on correlation of tickets therein.

The receiving can be via catcher equipment that is configured as a base station interfacing with a 5G network associated with the 5G core network.

BRIEF DESCRIPTION OF THE DRAWINGS

The present disclosure is illustrated and described herein with reference to the various drawings, in which like reference numbers are used to denote like system components/method steps, as appropriate, and in which:

FIG. 11 is an example embodiment of associating SUPIs and SUCIs by correlation between HTTP/2 Request/response. FIG. 12 is a second example embodiment of associating SUPIs and SUCIs by correlation between HTTP/2 Request/response using a specific key named "authCtxId" that is present in the response of the procedure of FIG. 11 and in the request of the second procedure. FIG. 13 shows the interaction between N1N2 and SBI for the second example embodiment. FIG. 14 is a third example embodiment of associating SUPIs and SUCIs by adding an enrichment ticket to share SUCI and AuthCtxId between the SBI PU. FIG. 15 is a fourth example embodiment of associating SUPIs and SUCIs by a correlation between N1N2 and SBI based on RES.

DETAILED DESCRIPTION OF THE DISCLOSURE

Again, the present disclosure relates to systems and methods for international mobile subscriber identity (IMSI) catchers, and, more particularly, to a subscriber permanent identifier (SUPI) catcher for use in 5G networks which associates SUPI and subscriber concealed identifier (SUCI).
IMSI Catcher For homeland security, law enforcement, etc., there is a product called an IMSI catcher that act like a fake cell tower to intercept communications (calls, text messages, Internet traffic, and more) from a targeted UE, then relay to the target cell tower of the network operator. This solution allows also to check for the presence of a perpetrator in a specific area or even figure out their exact location without the need for operator cooperation. This type of procedures is also known as a man-in-the-middle (MitM) attack and those products are normally sold to law enforcement agencies. This product is based on catching IMSIs that are not encrypted on the 2G, 3G and 4G networks. Instead, they are transmitted in plain text over the air. So, although calls and texts are encrypted in 4G, the user's meta data—identity and location—is not.
SUPI Concealment/De-Concealment However, the arrival of 5G implies a significant challenge to this type of product due to encrypted user identifiers. 5G created a new kind of identifier, the SUPI (subscription permanent identifier), but UEs do not send the SUPI over the air. Instead, they send an encrypted key called a SUCI (subscription concealed identifier) and this blinds the IMSI catchers completely and prevents them obviously from working independently away from operators.

In 5G Networks, the first registration uses a concealed SUPI for security purpose. The concealed SUPI (aka SUCI) is generated by using a public key of network. The public keys are stored to SIM card and never seen or exchanged between equipment involved in 5G. During this first registration, the UE and the Network negotiate a 5G-global unique temporary identifier (GUTI) that will be used for further registrations. So, if a system that supervises a 5G network is unable to get the SUPI (aka IMSI) from the SUCI during the first registration, it will be almost impossible to track users in 5G network based on the SUPI.

Figure 1:
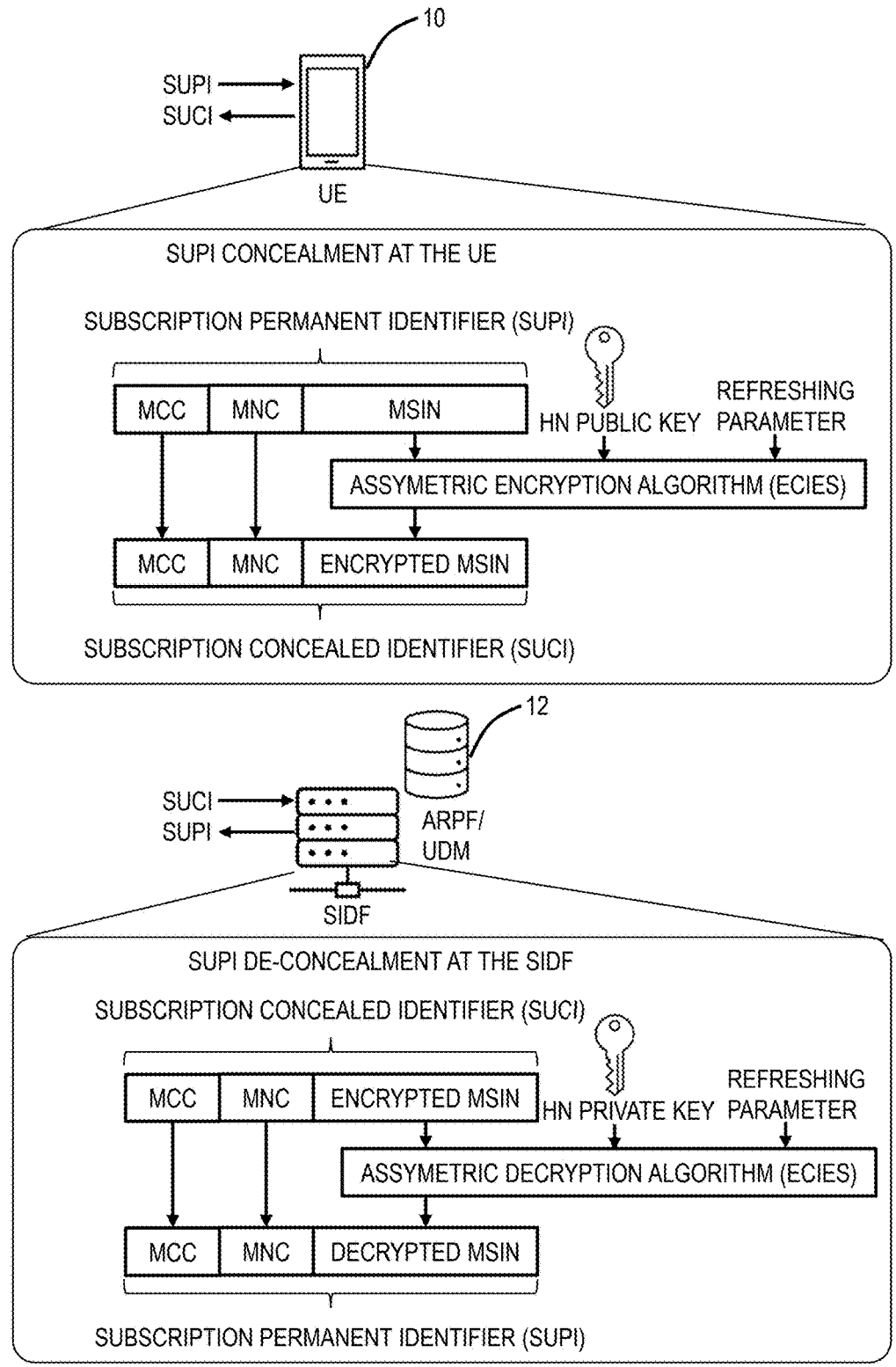
FIG. 1 is a diagram of SUPI concealment at user equipment and SUPI de-concealment at a subscription identifier de-concealing function (SIDF) at a unified data management (UDM).

FIG. 1 is a diagram of SUPI concealment at a UE 10 and SUPI de-concealment at a subscription identifier de-concealing function (SIDF) at a unified data management (UDM) 12. A SUPI is a 5G globally unique identifier allocated to each subscriber and defined in 3GPP specification TS 23.501. The SUPI includes a mobile country code (MCC) and the next two or three form the mobile network code (MNC) identifying the network operator. The remaining (nine or ten) digits are known as mobile subscriber identification number (MSIN) and represent the individual user of that particular operator. The SUPI is concealed at the UE 10 via an asymmetric encryption algorithm, such as elliptic curve integrated encryption scheme (ECIES) which is used to encrypt the MSIN. Of note, the SUCI could change at any time due to a refreshing parameter embedded in the encryption mechanism. The SIDF is a service offered by UDM 12 to resolve SUPI from the SUCI, as defined in ETSI TS 133 514, e.g., 5G Security Assurance Specification (SCAS) for the Unified Data Management (UDM) network product class, 3GPP TS 33.514 version 16.3.0 Release 16, November 2020, the contents of which are incorporated by reference in their entirety.

Of note, an IMSI catcher is a product/solution that operates in 2G, 3G, and 4G networks. In 5G, the equivalent product/solution can be referred to as a SUPI catcher.

Based on the fact the SUPI is encrypted as the SUCI over-the-air, there is a need to coordinate monitoring with the mobile network operator (MNO) to decrypt the SUCI. Since the MNO controls the security and privacy of the IMSI from the subscriber identify module (SIM) to the network, lawful intercept can still work with agents to monitor approved criminal targets.

Figure 2:
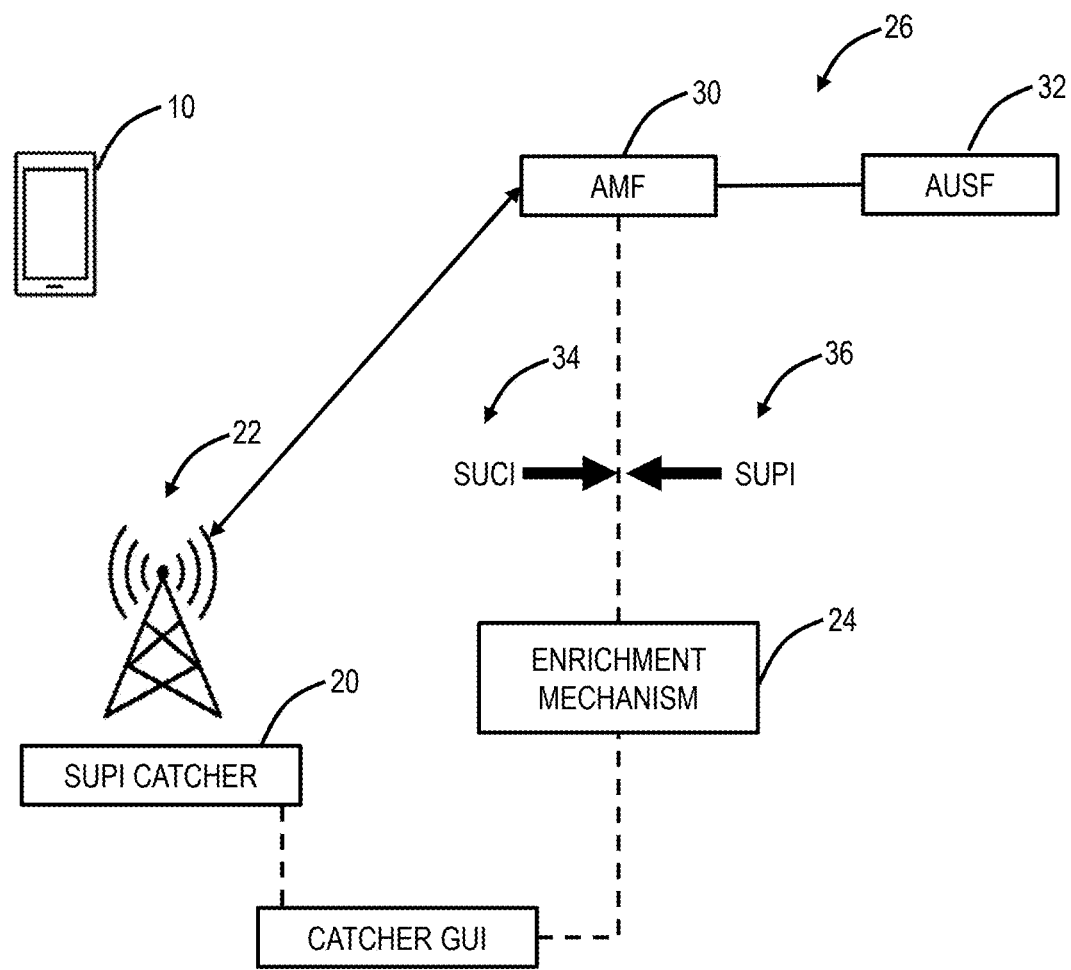
FIG. 2 is a network diagram of a SUPI catcher that implements a SUCI catch procedure through a fake base station and uses an enrichment mechanism in a core network to obtain the real SUPI, from the SUCI.

In various embodiments, the present disclosure includes an approach that removes the dependency of the law enforcement agencies on operators by allowing them to capture requested details using over-the-top-provider (OTTP) components. The monitoring solution can capture and process the traffic without the need to get the operators approval to access data per session or per user.
SUPI Catcher FIG. 2 is a network diagram of a SUPI catcher 20 that implements a SUCI catch procedure through a fake base station 22 and uses an enrichment mechanism 24 in a core network 26 to obtain the real SUPI, from the SUCI. The SUPI catcher 20 (which could also be referred to as an IMSI catcher) is connected to an access and mobility management function (AMF) 30 of an operator. The AMF 30 is one of the control plane network functions (NF) of the 5G core network (5GC). The AMF 30 is also connected to an authentication server function (AUSF) 32 which performs authentication with a UE 10. Of note, the UE 10 uses a SUCI 34 over-the-air to the SUPI catcher 22, and the AMF 30 is configured to perform the SIDF to obtain a corresponding SUPI 36.

The SUPI catcher 22 can be a fake base station or the like that is attached to the network as a genuine base station and interfaces with the operator core network 26. The setup of the SUPI catcher 22 as a base station is performed in a first step. A second step involves deploying an evolved software capture via the enrichment interface 24 that can obtain the SUCI 34 and SUPI 36 on both sides of the AMF 30 to create a matrix that associates each SUCI 34 (or updated SUCI 34 based on the encryption) with the relevant SUPI 36. The enrichment mechanism 24 is based on exchanges with tickets between processing units (PU) through a message bus (e.g., Apache Kafka) topics.

A summary of the present disclosure includes:

The SUPI catcher 22 equipment is connected to the AMF 30 of the operator.

When the SUPI catcher 22 equipment receives a SUCI 34 from the UE 10, the AMF 30 starts authentication with the UE 10, and the enrichment mechanism 24 sees the SUCI 34 received from the UE 10.

The enrichment mechanism 24 maps the SUCI 34 with the actual SUPI 36 through monitoring the cross signaling on both of the AMF 30 sides. For example, this monitoring is based on probes connected in the core network 26.

The enrichment mechanism 24 returns the real-time captured identifiers to the SUPI catcher 22 to identify if this is the targeted UE 10 for further actions.

The above procedure continues in real-time to exchange the real SUPI 36 whenever the SUCI 34 is updated.

The approach described herein to obtain the SUPI 36 of the UE 10 and its associated traffic does not require any changes to the existing network design. This solution is important to homeland security agencies as well as service monitoring. The present disclosure uses OTTP components to remove the dependency of the law enforcement agencies on operators by allowing them to capture requested details. The monitoring solution can capture and process the traffic without the need to get the operators approval to access data per session or per user.

UDM

The evolved software capture to obtain the SUCI and SUPI can be also attached to both sides of the UDM 12, as well as or in addition to the AMF 30, to create a matrix that associates each SUCI 34 (or updated SUCI 34 based on the encryption) with the relevant SUPI 36. This use case can is more relevant to roaming model when catcher 20 equipment is located on a third-party operator and SUCIs are exchanged via SEPP or maybe through SCP exchanges.

Encryption

The 5G core interfaces can be encrypted with TLS1.3 to improve their resiliency in a cloud native design as part of service-based architecture (SBI) model. In another model, the evolved software capture and enrichment mechanism could benefit from new decryption solutions to capture message exchanges in clear mode especially in fully encrypted SBI interfaces in live networks. Various decryption mechanisms could be used to decrypt SBI interfaces considering the type of 5G core deployment and hosting domain (for example, using eBPF, extended Berkeley Packet Filter).

Probes

There can be various probes in the 5G network for various service assurance functions and the like. As described herein, a probe can be a virtual network function (VNF), such as compliant with ETSI/MANO and ONAP standards, deployed in the cloud. In an embodiment, there can be a probe to supervise the 5G network that needs to get the IMSI (SUR) to track UEs.

In the 3GPP specification, there is a procedure in the Service Based Architecture between the UDM (Unified Data Management) and UDR (User Data Repository) that uses the SUCI in the request and gets the SUPI in the response because the SUPI is the main identity used in the 5G core network 26. The basic issue with this procedure is that the probe needs to capture this exchange so it must access deep in the 5G core network 26. Moreover, to avoid a security breach, some customers colocalizes these two network functions (UDM and UDR) in a unique network function so this procedure is not visible in the 5G core network 26.

One implementation of a probe, using the 3GPP specification, can implement the hypertext transfer protocol (HTTP)/2 Request/Response Correlation between the UDM and the AUSF. To remove the issue with colocalized network functions, the probe can implement the correlation between two HTTP/2 procedures using a correlation key named AuthCtxId. This can include a limitation due to HTTP/2 load balancing that prevents a good association between SUCI and SUPI. There can be a ticket exchange between HTTP/2 processing units (PU) to allow the two procedures to be processed by different PUs.

As is described herein, the existing probes are used to provide the enrichment mechanism 24 to enrich the SUPI catcher 20. The probes can be software, network functions, etc. that are configured to monitor and process data to a message bus (e.g., Apache Kafka). The enrichment mechanism 24 is based on monitoring the exchanges on the message bus.

Stream Processing System and Enrichment Mechanism

Figure 3:
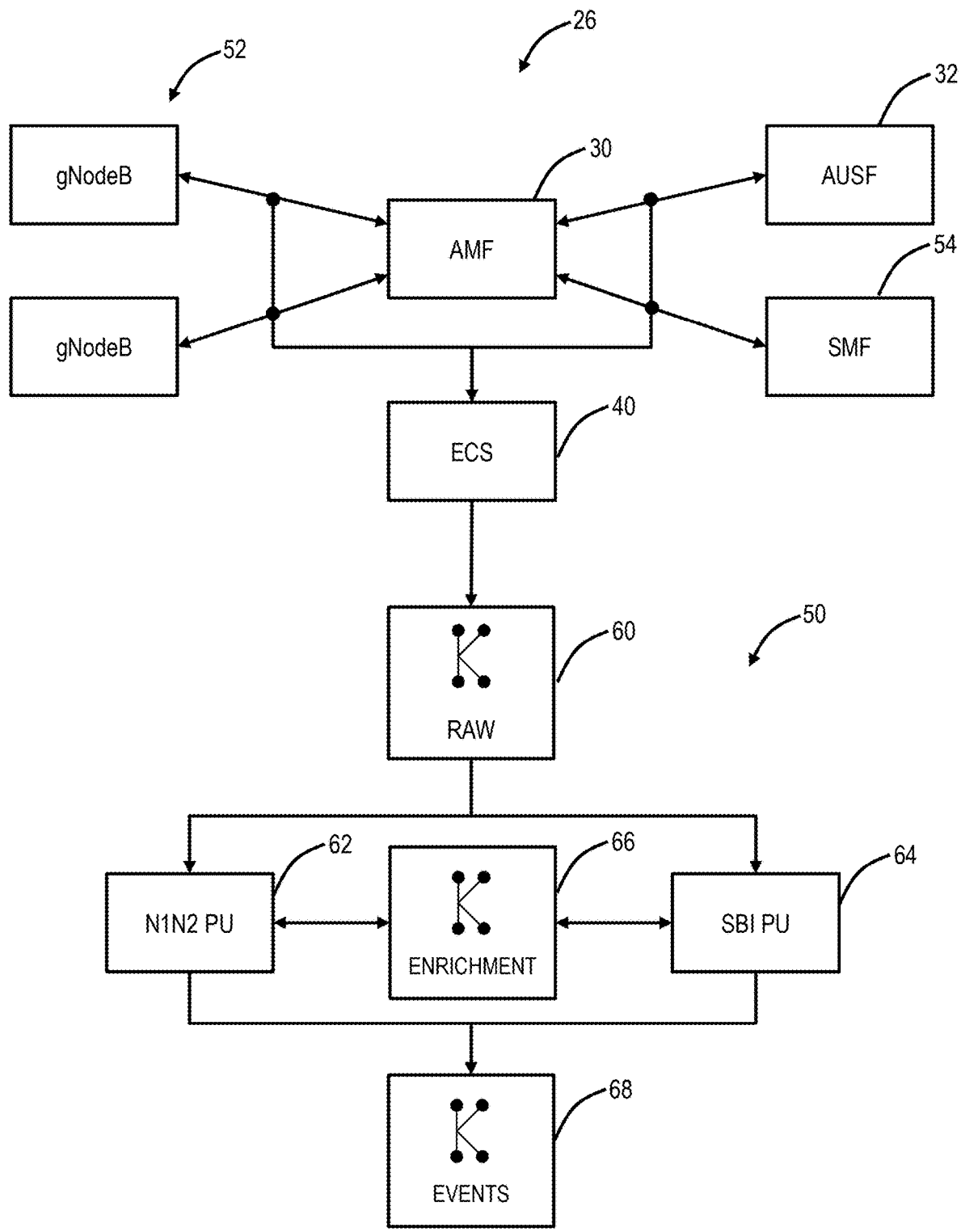
FIG. 3 is a network diagram of the 5G core network connected to an enhanced capture service (ECS) which provides data to a stream processing system.

FIG. 3 is a network diagram of the 5G core network 26 connected to an enhanced capture service (ECS) 40 which provides data to a stream processing system 50. Those skilled in the art will recognize FIG. 3 is a logical diagram of functions and interconnectivity. The 5G core network 26 includes one or more base stations 52, i.e., gNodeB in 5G, the AUSF 32, and a session management function (SMF) 54, each being connected to the AMF 30. The ECS 40 can be a virtual network function (VNF), probe, virtual probe (i.e., a probe implemented as a VNF), etc. The ECS 40 is connected to and/or configured to monitor communications between the base stations 52 and the AMD 40, the AUSF 32 and the AMF 30, the SMF 54 and the AMF 30, and the like. The ECS 40 provides the monitored communications to the stream processing system 50.

The stream processing system 50 performs stream processing (also known as event stream processing, data stream processing, or distributed stream processing) which is a programming paradigm which views data streams, or sequences of events in time, as the central input and output objects of computation. Stream processing systems aim to expose parallel processing for data streams and rely on streaming algorithms for efficient implementation. The software stack for these systems includes components such as programming models and query languages, for expressing computation; stream management systems, for distribution and scheduling; and hardware components for acceleration including floating-point units, graphics processing units, and field-programmable gate arrays.

In an embodiment, the stream processing system 50 utilizes Apache Kafka, although other implementations are also contemplated. The foregoing description assumes the stream processing system 50 is Apache Kafka for illustration purposes. The stream processing system 50 includes a raw data collection component 60 that streams the raw data to processing units (PU) 62, 64, specifically an N1N2 PU 62 and a service based interface (SBI) PU 64. The N1 interface is a transparent interface from the UE 10 to the AMF 30. The N2 interface is the control plane interface between an Access Network—NG-RAN or non-3GPP WLAN—and the 5G core network 26. The data from the PUs 62, 64 is provided to an enrichment function 66, and various events 68 are detected based thereon.

The enrichment function 66 is configured to perform data enrichment which is a process of merging data from the PUs

62, 64. Enriching Data from numerous sources via joins is a fundamental process in streaming data (and traditional databases). In an embodiment, enrichment is based on exchanges with tickets between processing unit (PU) through message bus (e.g., Kafka) topics. Tickets are produced by the PUs 62, 64 as soon as the event 68 is ready. Tickets are consumed by the PUs 62, 64 when they are received. There is a delay between producing and consuming to counteract Kafka's latency.

The ECS 40 is responsible to load balance frames between the PUs 62, 64 from the same interfaces. For the SBI, it can use the Internet Protocol (IP) addresses and the Transmission Control Protocol (TCP) ports in ascending order to create the load balancing key. For Stream Control Transmission Protocol (SCTP), it can use the lowest SCTP Verification Tag between uplink and downlink and the SCTP Ports in ascending order to create the load balancing key.

Data Enrichment Examples

The following are example enrichment topics via the stream processing system 50:
IMSI/GUTI
IMSI/international mobile equipment identity (IMEI)
IMSI/mobile station integrated services digital network (MSISDN)
IMSI/SUCI
IMSI/Token (SBI only)
Token/SUCI/RAND (SBI & N1N2)
IMSI/AMF NGAP Id (N1N2 only)
IMSI/Handover Hash (N1N2 only)

As is described herein, the data enrichment can be used to obtain data for the association of SUCI to SUPI.

Data Enrichment Signaling

Figure 7:
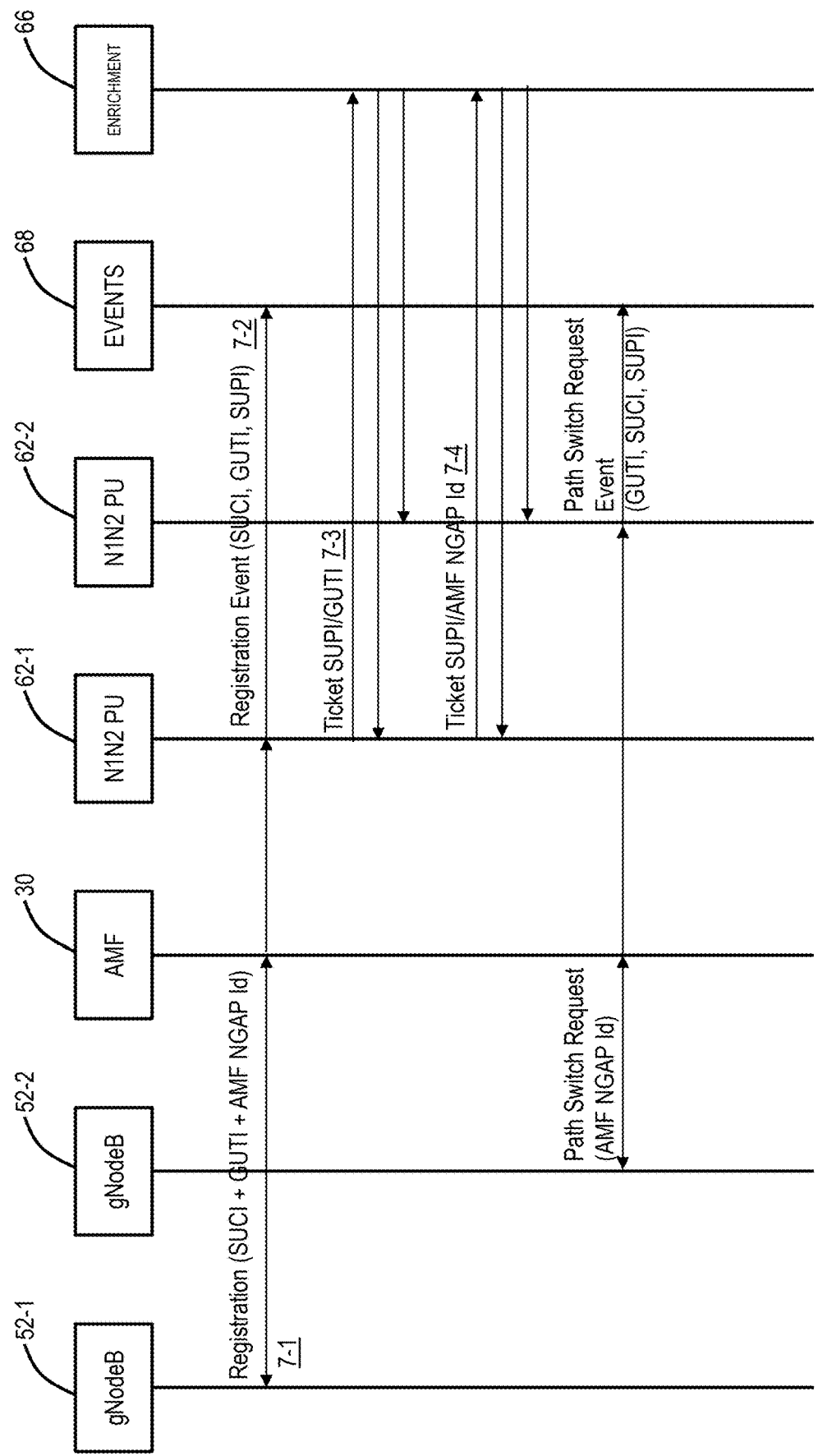
Figure 8:
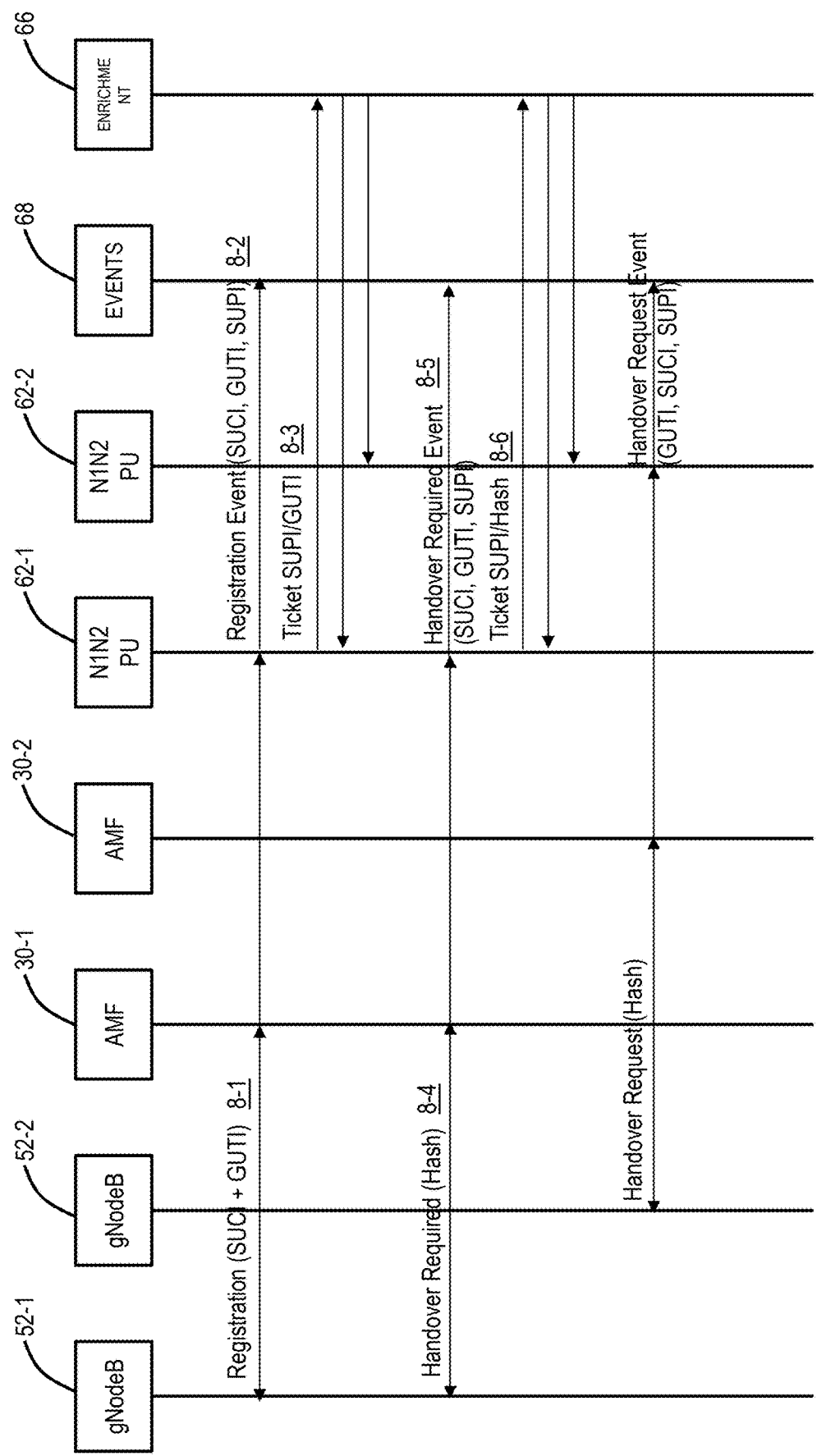
Figure 9:
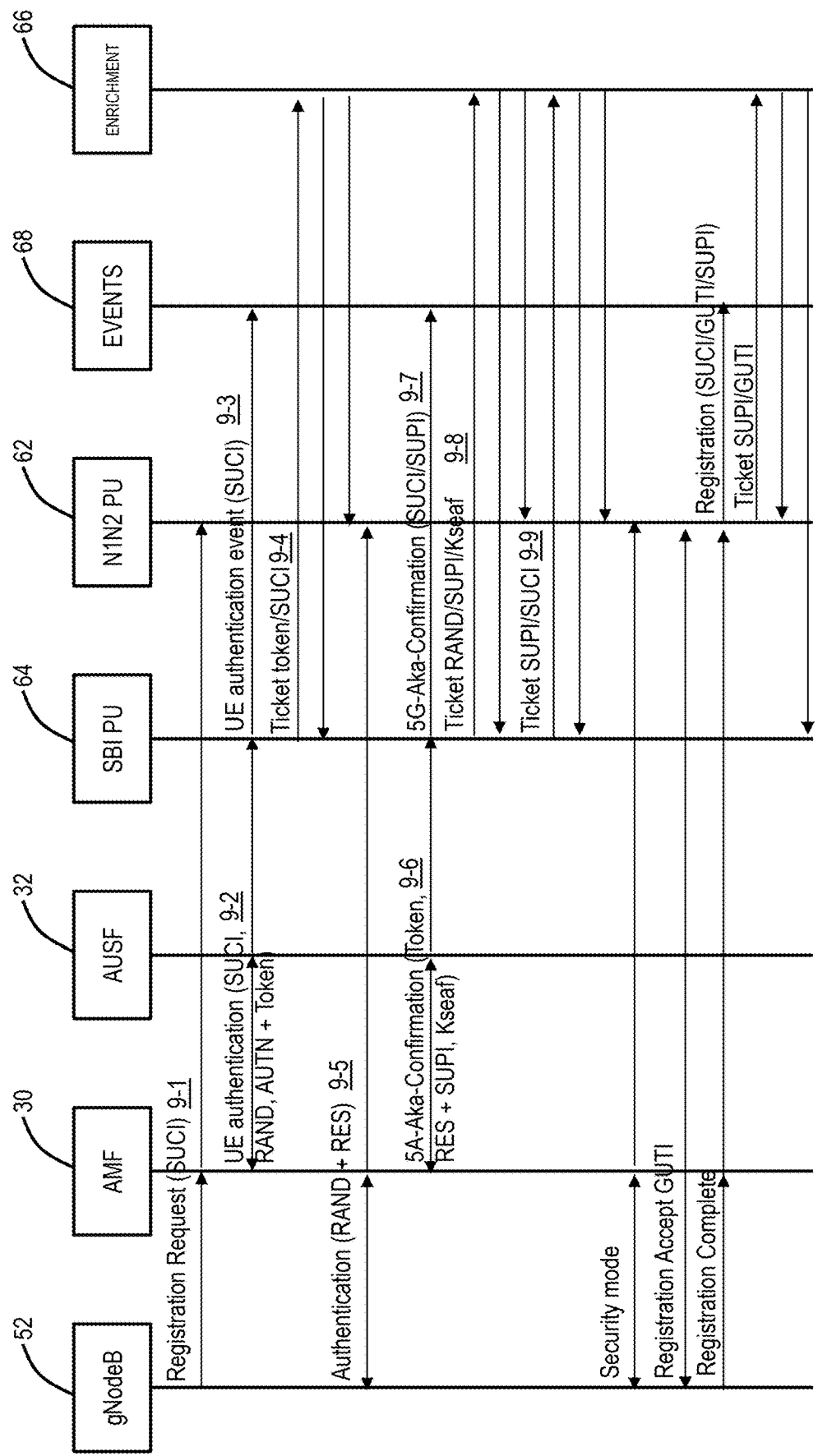

FIGS. 4-9 are flow diagrams that illustrate examples for the signaling in the enrichment mechanism, including Intra-SBI enrichment: AUSF example (FIG. 4), Intra-SBI enrichment: SMF example (FIG. 5), Intra-N1N2 enrichment: idle Mobility (FIG. 6), Intra-N1N2 enrichment: Soft Mobility (FIG. 7), Intra-N1N2 enrichment: Hard Mobility (FIG. 8), and Inter-interface enrichment: SBI/N1N2 (FIG. 9). Of note, these examples use the PUs 62, 64 and focus on intra-PU enrichment as well as inter-PU enrichment.

Figure 4:
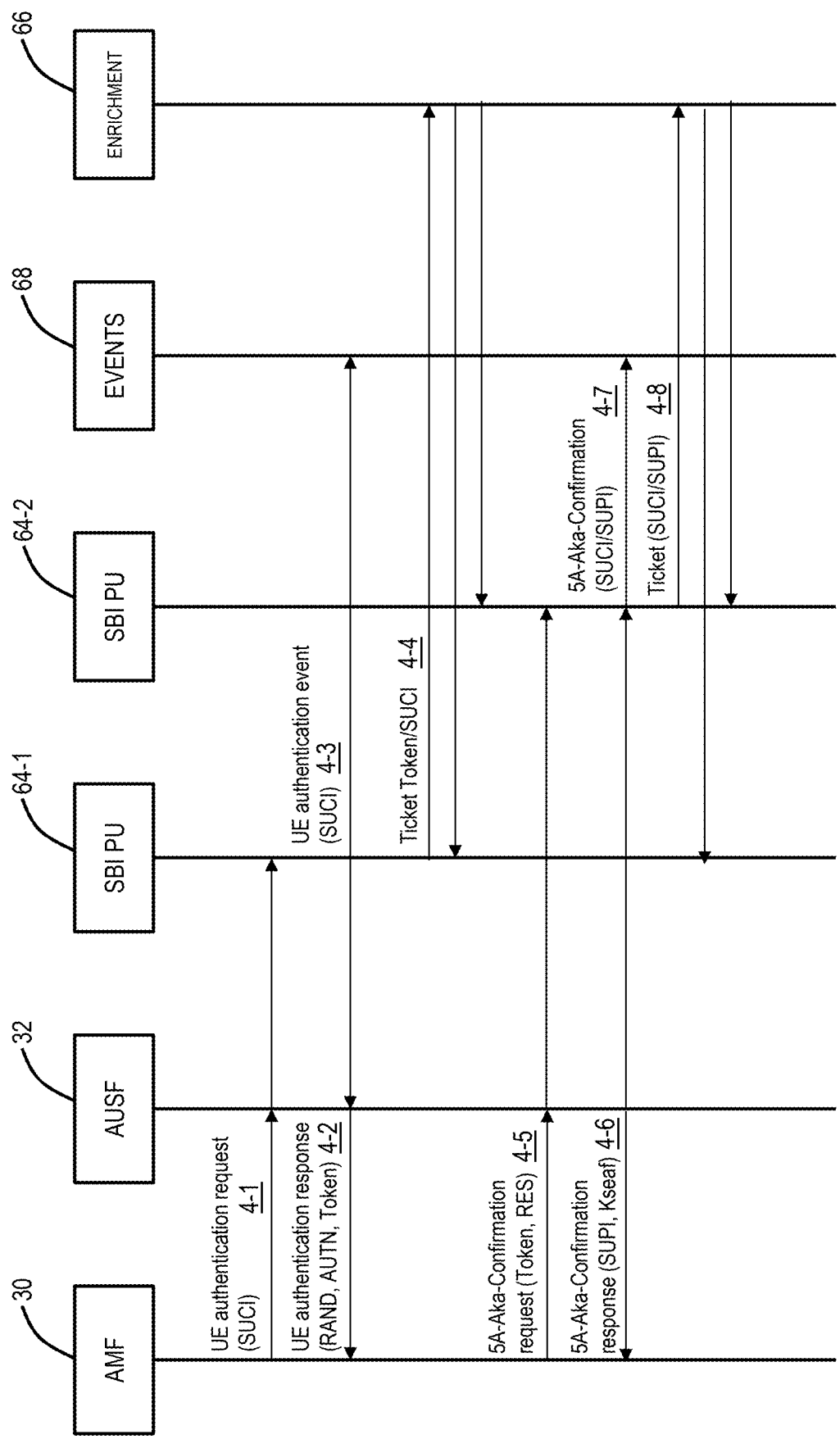
FIGS. 4-9 are flow diagrams that illustrate examples for the signaling in the enrichment mechanism, including Intra-SBI enrichment: AUSF example (FIG. 4), Intra-SBI enrichment: SMF example (FIG. 5), Intra-N1N2 enrichment: idle Mobility (FIG. 6), Intra-N1N2 enrichment: Soft Mobility (FIG. 7), Intra-N1N2 enrichment: Hard Mobility (FIG. 8), and Inter-interface enrichment: SBI/N1N2 (FIG. 9).

In FIG. 4, there is a UE authentication request with the SUCI (step 4-1), and this authentication request (SUCI) is provided to the SBI PU 64-1. There is a UE authentication response with a RAND, AUTN, and token from the AUSF 32 to the AMF 30 (step 4-2), leading to an authentication event (SUCI) (step 4-3). In data enrichment 66, there can be a ticket token for the SUCI (step 4-4). In another example, there is a 5G Authentication and Key Management 5G-AKA request (step 4-5) which is provided to the SBI PU 64-2. There is an AKA confirmation response (step 4-6), leading to an AKA confirmation event (SUCI/SUPI) (step 4-7). In data enrichment 66, there can be a ticket for the SUCI/SUPI (step 4-8).

Figure 5:
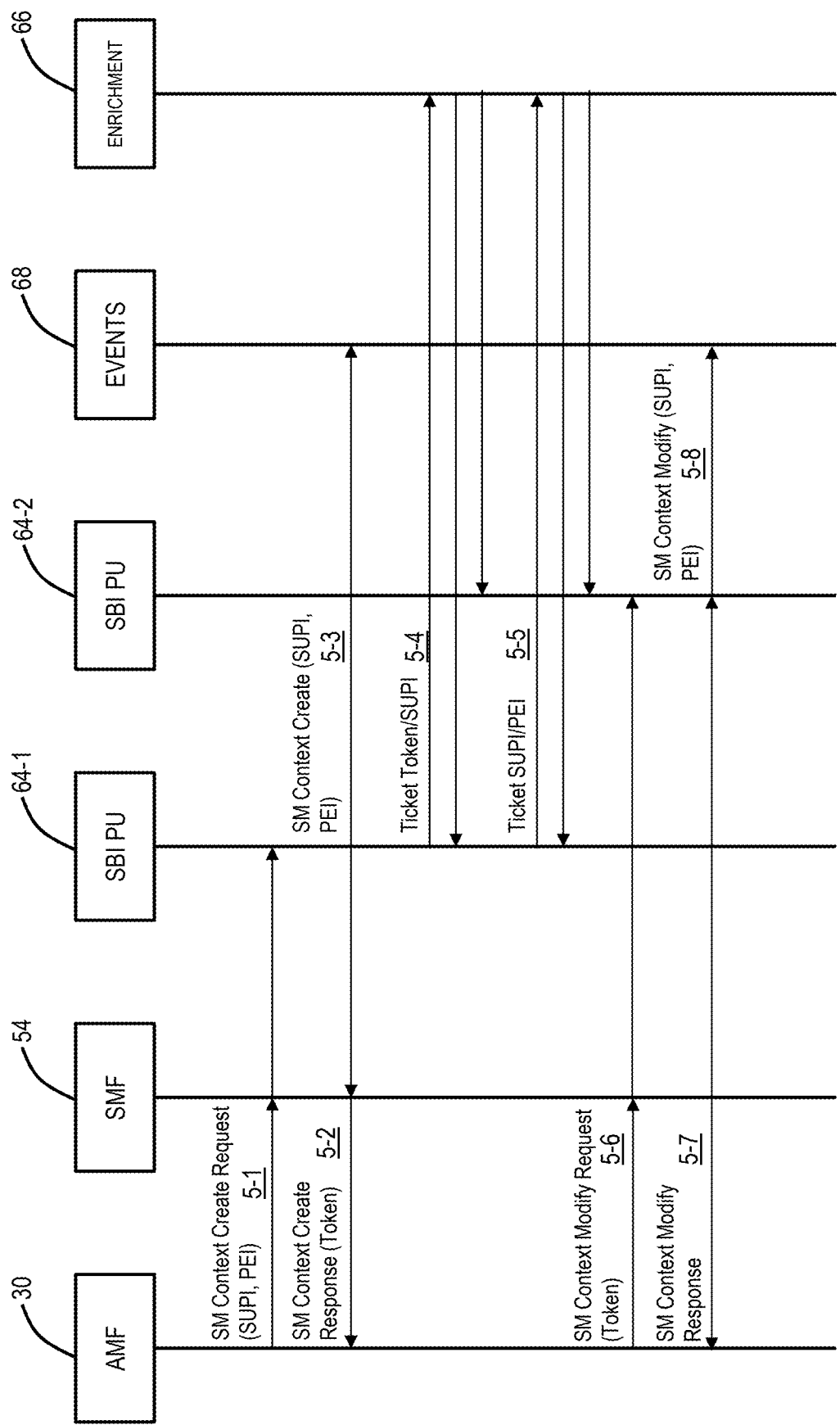

In FIG. 5, there is a SM context create request (step 5-1) that is provided to the SBI PU 64-1, and there is a SM context create response (step 5-2) that least to a SM context create event (SUPI, permanent equipment identifier (PEI)) (step 5-3). In data enrichment 66, there can be a ticket token for the SUPI (step 5-4) and for the SUPI/PEI (step 5-5). In another example, there is a SM context modify request (step 5-6), SM context modify response (step 5-7), leading to a SM context modify event (step 5-8).

Figure 6:
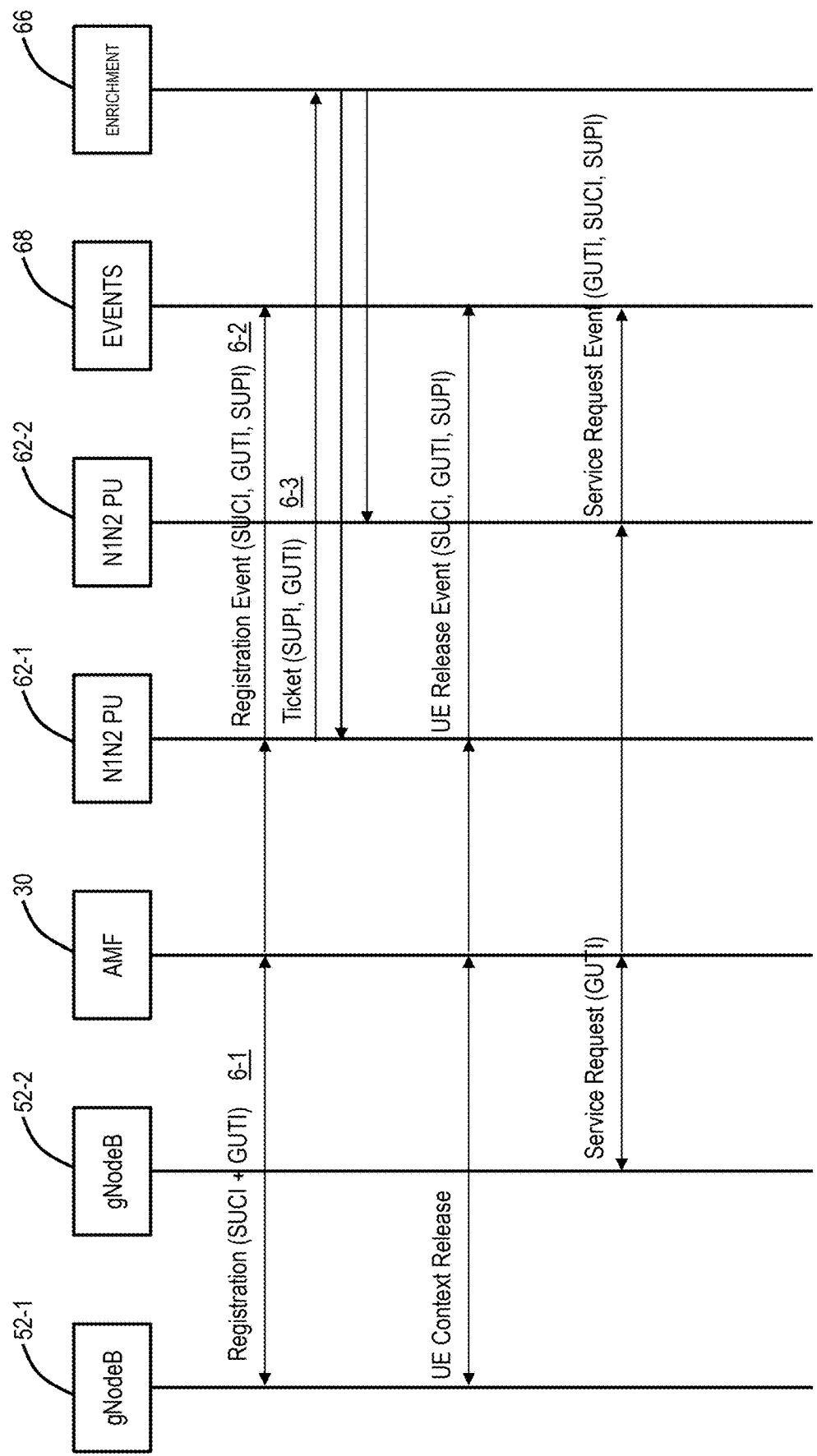

In FIG. 6, there is a registration from the base station 52-1 to the AMF 30 (step 6-1) which leads to a registration event (SUCI, GUTI, SUPI) (step 6-2). In data enrichment 66, there can be a ticket token for the SUPI, GUTI (step 6-3). In FIG. 7, there is a registration from the base station 52-1 to the AMF 30 (step 7-1) which leads to a registration event (SUCI, GUTI, SUPI) (step 7-2). In data enrichment 66, there can be a ticket token for the SUPI, GUTI (step 7-3) and for the SUPI/AMD NGAP Id (step 7-4).

In FIG. 8, there is a registration from the base station 52-1 to the AMF 30-1 (step 8-1) which leads to a registration event (SUCI, GUTI, SUPI) (step 8-2). In data enrichment 66, there can be a ticket token for the SUPI, GUTI (step 8-3). In another example, there is a handover required from the base station 52-1 to the AMF 30-1 (step 8-4) which leads to a handover required event (step 8-5). In data enrichment 66, there can be a ticket for the SUPI, hash (step 8-6).

In FIG. 9, there is a registration request from the base station 52 to the AMF 30 (step 9-1) that is provided to the PU 62. There is UE authentication between the AMF 30 and the AUSF 32 (step 9-2) which leads to a UE authentication event (step 9-3). In data enrichment 66, there can be a ticket token for the SUCI (step 9-4). Next, there is authentication between the base station 52 and the AMF 30 (step 9-5), leading to AKA confirmation between the AMF 30 and the AUSF 32 (step 9-6), and an AKA confirmation event (step 9-7). In data enrichment 66, there can be a ticket for the RAND/SUPI/Kseaf (step 9-8) and for the SUPI/SUCI (step 9-9).

Capture System

Figure 10:
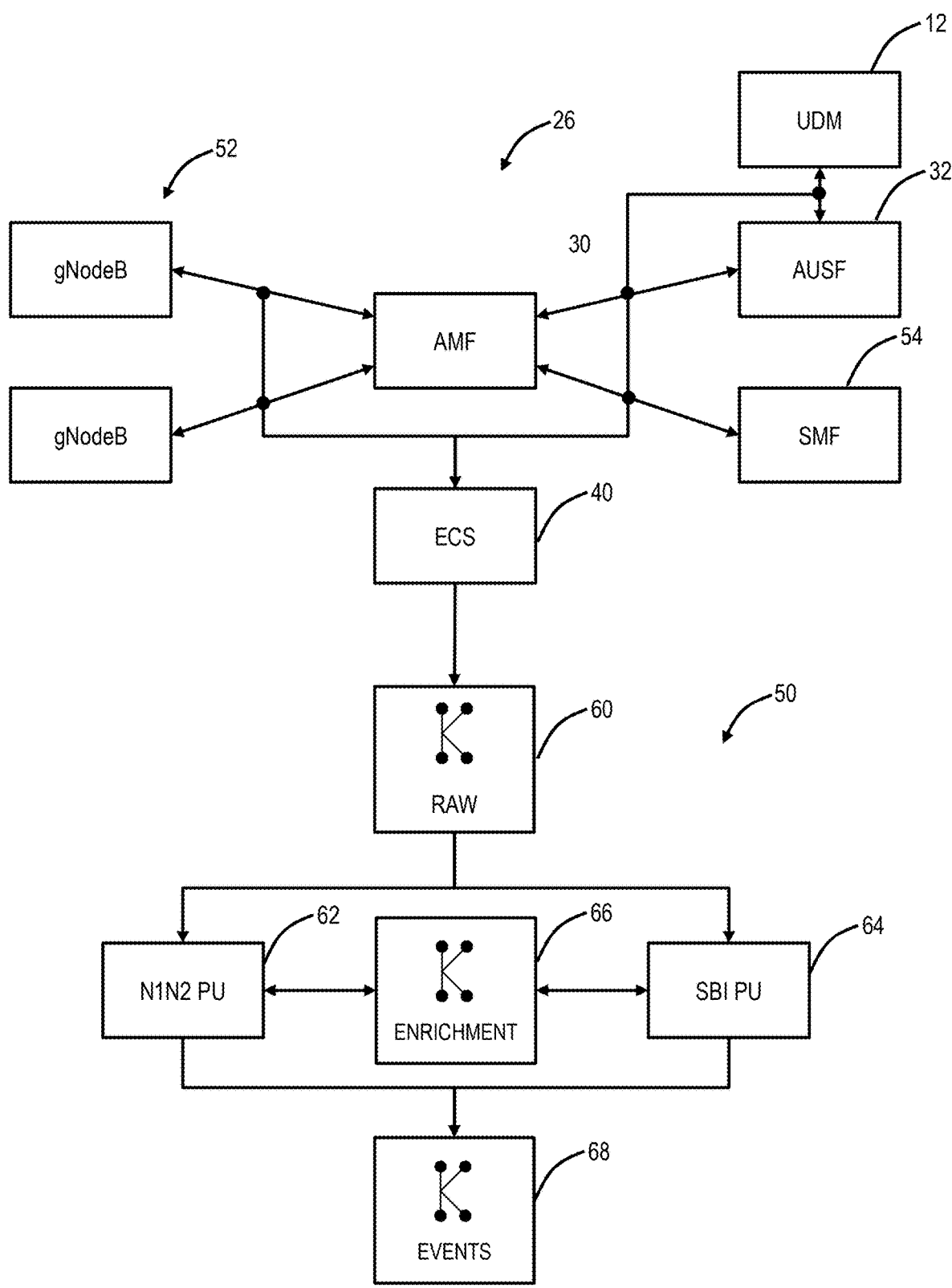
FIG. 10 is a network diagram of the 5G core network, including the UDM, connected to the enhanced capture service (ECS) which provides data to the stream processing system.

FIG. 10 is a network diagram of the 5G core network 26, including the UDM 12, connected to the enhanced capture service (ECS) 40 which provides data to the stream processing system 50. Again, the ECS 40 captures the raw frames and sends them through a Kafka topic to the PUs 62, 64. Each PU 62, 64 writes and reads enrichment tickets in Kafka Topics. Each PU 62, 64 writes enriched events in a Kafka topic. The ECS 40 loads balances the frames among the SBI PU 64 by TCP connections. One TCP connection is identified by using the IP addresses and the TCP Ports in ascending order (direction is not used).

Associating SUPI and SUCI

FIGS. 11-15 are flow diagrams of various example approaches for associating SUPIs and SUCIs, such as implemented through the ECS 40, the stream processing system 50, etc. Variously, FIGS. 11-15 present non-limiting examples of data enrichment to continually maintain an association between SUPIs and SUCIs for identifying UEs 10, such as via the SUPI catcher 20.

Figure 11:
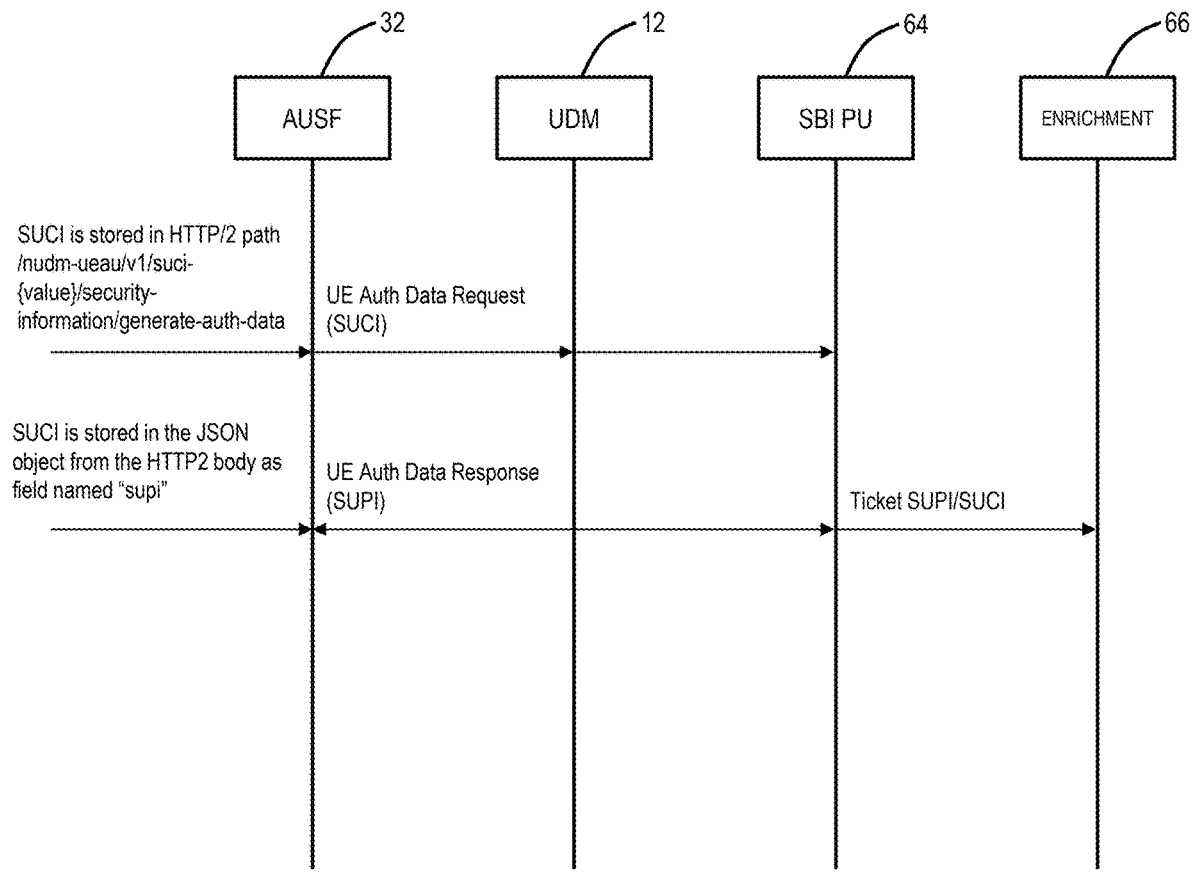
FIGS. 11-15 are flow diagrams of various example approaches for associating SUPIs and SUCIs, such as implemented through the ECS, the stream processing system, etc.

FIG. 11 is an example embodiment of associating SUPIs and SUCIs by correlation between HTTP/2 Request/response. The correlation between Request and Response is as follows: AUSF IP+UDM IP+AUSF TCP Port+UDM TCP Port+HTTP2 Stream Id as key. According to the 3GPP Specifications, the AUSF 32 should request the SUPI associated with a SUCI from the UDM 12 by using the UE Auth Data Procedure. It is a simple algorithm that only performs correlation between a request and response of the same procedure. In the UE Auth Data Request, the path in the HTTP/2 header uses the following format "/nudm-ueau/v1/suci-{value}/security-information/generate-auth-data" where value is the SUCI as string. When the SBI PU 64 receives this frame, it extracts the SUCI in the path and stores the association SUCI/Request correlation key. In the body of the response, there is a JavaScript Object Notation (JSON) Object that contains a member named "supi" which contains the SUPI with the following format "imsi-{value}" where value is the IMSI as string. When the response frame is received, the SBI PU 64 searches for the associated SUCI by using the Response correlation key. Then it decodes the JSON object in the body looking for the key member named "supi". Finally, it associates the SUCI with the SUPI and generates an enrichment ticket. For this processing, there is only one interface to decode. Its limitations include the HTTP2 header compression could lead to unreadable value for the path in the request=>No SUCI and the capture point in 5G Core between AUSF and UDM is not always available due to collocated equipment.

Figure 12:
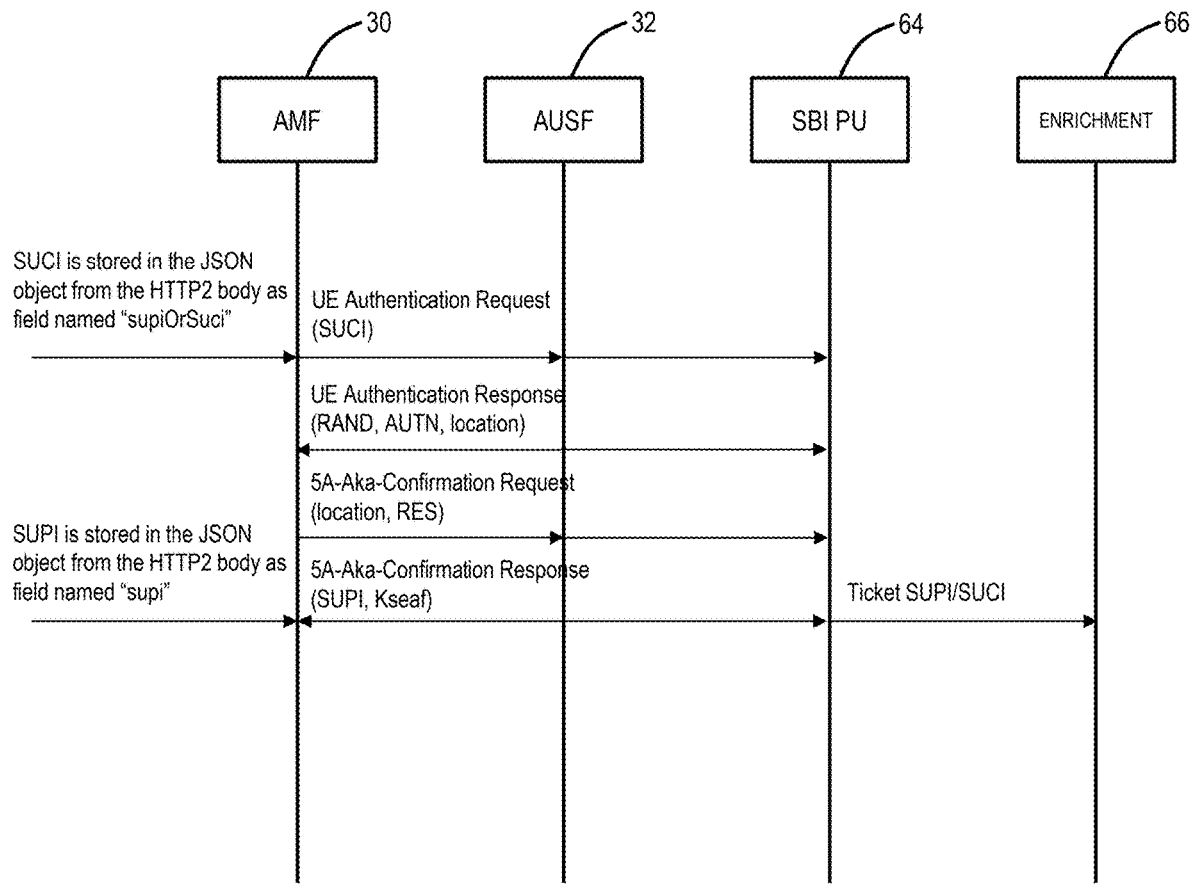
Figure 13:
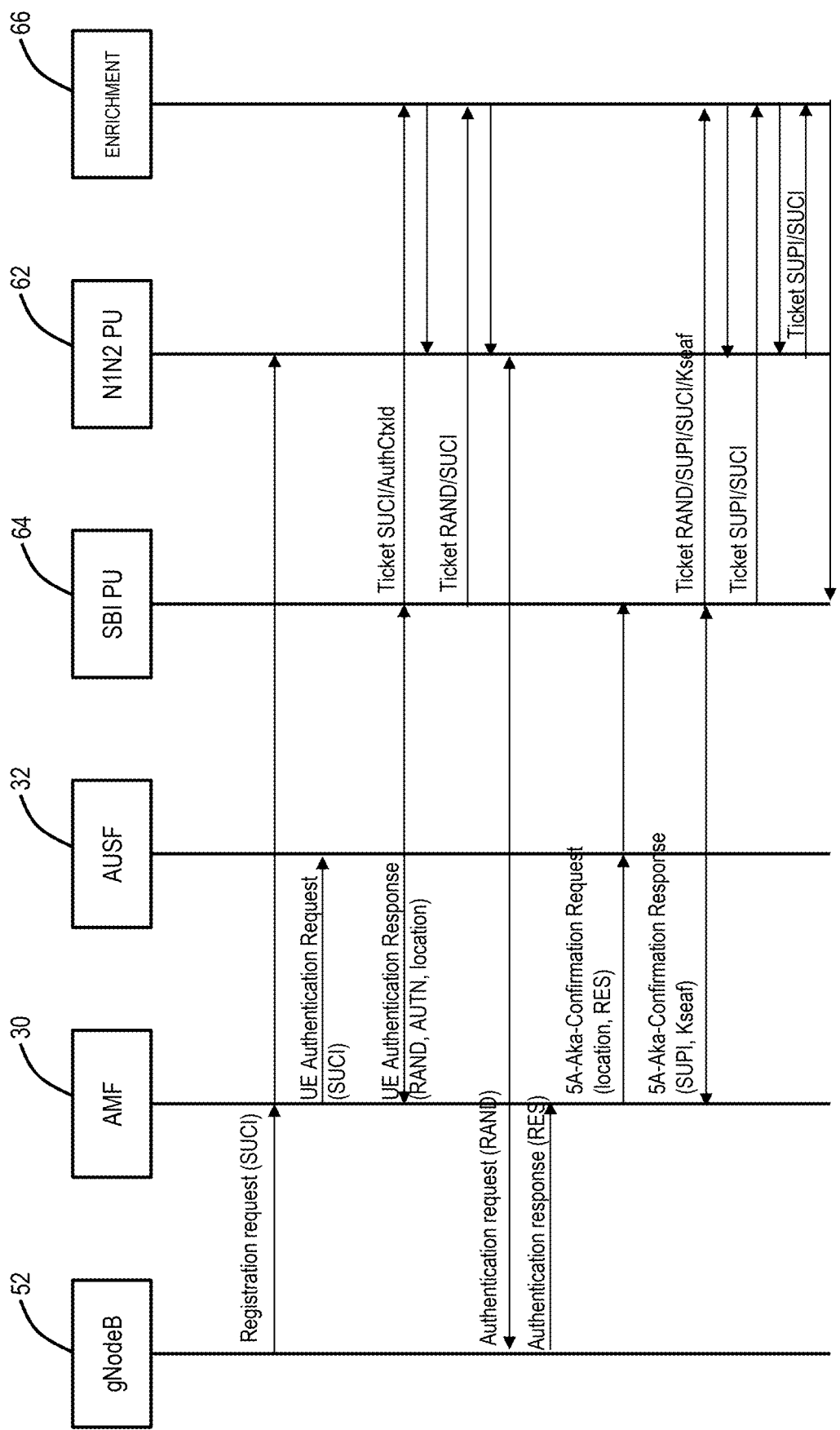

FIG. 12 is a second example embodiment of associating SUPIs and SUCIs by correlation between HTTP/2 Request/response using a specific key named "authCtxId" that is present in the response of the procedure of FIG. 11 and in the request of the second procedure. According to the 3GPP Specifications, during Authentication the AMF 30 should interact with the AUSF 32 to get the ciphering key associated with the SUCI. The first procedure allows the AMF 30 to get from the AUSF 32 the inputs for testing the UE 10 (RAND+AUTN). The AMF 30 provides them to the UE 10 through the N1N2 interface. Then the UE 10 computes the RES and send it to the AMF 30 through the N1N2. The AMF 30 sends this RES to the AUSF 32 that replies with the Key and the SUFI. So two procedures are involved between the AMF 30 and the AUSF 32, the UE-authentication and the 5g-aka-confirmation. The correlation between each Request and Response is as follows: AMF IP+AUSF IP+AMF TCP Port+AUSF TCP Port+HTTP2 Stream Id as key. In the UE-authentication request, the SUCI is stored in a member named "supiOrSuci" contains in the JSON object embedded in the body. When the SBI PU receives this frame, it extracts the SUCI in the body and stores the association SUCI with Request correlation Key. In the UE-authentication Response, there is a field in the header named "location" that contains an URI with the following format "{apiRoot}/nausf-auth/v1/ue-authentications/{authCtxId}/5g-aka-confirmation" where apiRoot could be empty, an IP Address or a Full Qualified Domain Name and authCtxId is a random and unique Identifier generated by the AUSF. When the SBI PU receives this frame, it uses the Response correlation key to get the SUCI. Then it extracts the AuthCtxtId and the IP Address for the "5g-aka-confirmation" procedure (shortened as 5g-aka IP Address). In a first version, if the apiRoot is empty or a fully qualified domain name (FQDN), the 5g-aka IP Address is the AUSF IP Address, else 5g-aka IP Address is the IP Address in the apiRoot. In a second version, the 5g-aka IP Address is always the AUSF IP Address. Finally, the SBI PU stores the association between SUCI and AuthCtxId+5g-aka IP Address. In the 5g-aka-confirmation Request, the path used in the header is a substring from the "location" field seen in the UE-authentication Response. The format of the path is then "/nausf-auth/v1/ue-authentications/{authCtxId}/5g-aka-confirmation". When the SBI PU receives this frame, it parses the path to extract the AuthCtxId and add the destination IP Address to create a key and to search for an associated SUCI. If the SUCI is found, it stores the associated SUCI with the Request correlation key. In the 5g-aka-confirmation Response, the SUFI is then mandatory and is in the body as a member named "supi" in the embedded JSON object. When the SBI PU receives this frame, it uses the Response correlation key to get the SUCI. Finally, it associates the SUCI with the SUFI and generates an enrichment ticket This second example embodiment has a capture point at the AMF 30 not in the 5G core network 26. It only has one interface to decode. Its limitations include the following: Location and path parsing for AuthCtxId could be costly. The correlation between two procedures is based on a string search. If the two procedures do not use the same IP addresses, the correlation could fail due to load balancing algorithm in SBI Pipelines. FIG. 13 shows the interaction between N1N2 and SBI for the second example embodiment.

Figure 14:
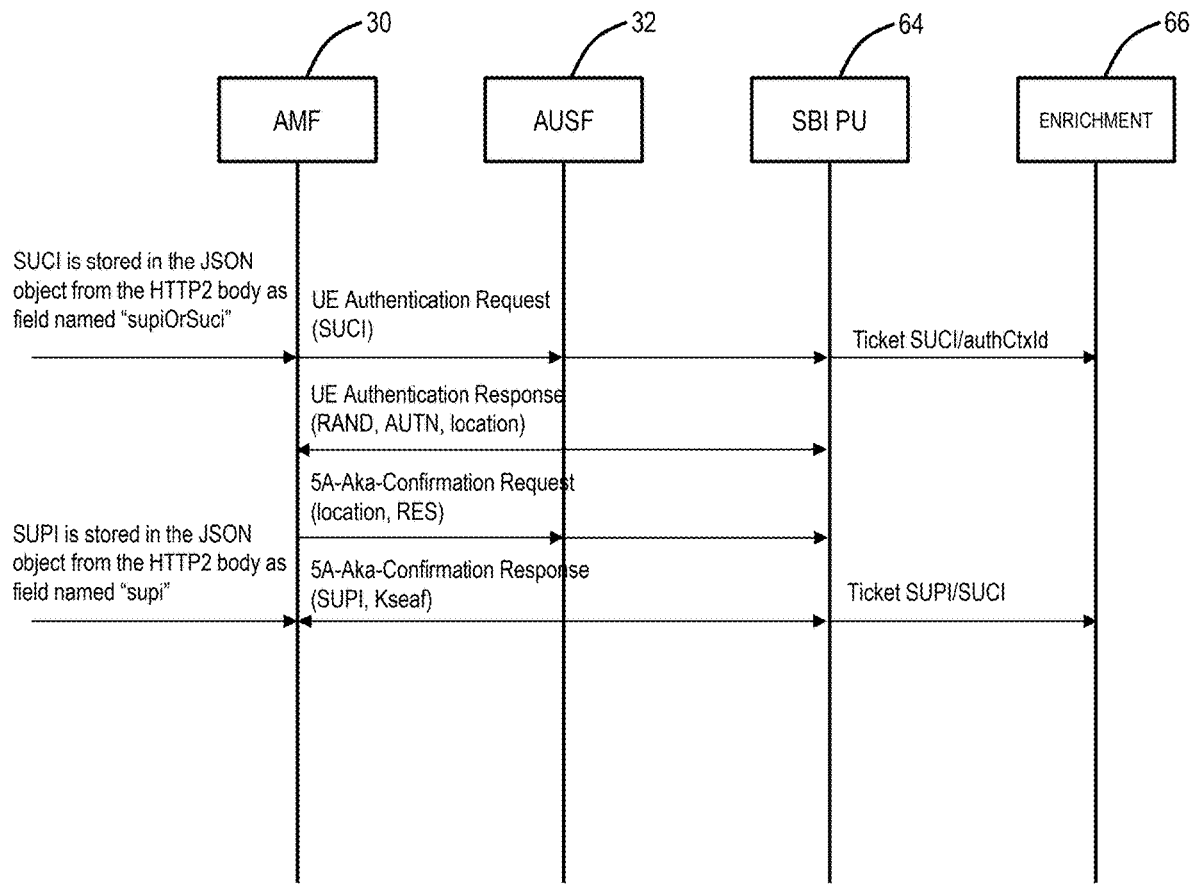

FIG. 14 is a third example embodiment of associating SUPIs and SUCIs by adding an enrichment ticket to share SUCI and AuthCtxId between the SBI PU 64. In this embodiment, the IP Address was removed in the correlation key between procedures to avoid an issue in case of multiple addresses for the AUSF 32. When the UE-authentication response is received, the SBI PU 64 writes an enrichment ticket for the association AuthCtxId with SUCI. When a SBI PU receives the ticket, it stores this association. When a SBI PU receives the 5g-aka-confirmation request, it extracts the AuthCtxId from the path and stores it with the Request Correlation key. When the SBI PU receives the 5g-aka-confirmation response, it uses the Response correlation key to get the AuthCtxId and extracts the SUPI. Then it waits during several milliseconds (this delay is configurable) to allow AuthCtxId ticket to arrive. After this wait, the SBI PU searches for the SUCI associated with the AuthCtxId. Finally, it associates the SUCI with the SUPI and generates an enrichment ticket. The capture point is at the AMF 30 is not in the 5G core network 26. It has only one interface to decode. It addresses the Load balancing limitation of the second example embodiment. Its limitations include Location and path parsing for AuthCtxId could be costly. The correlation between two procedures is based on string search. The delay between the 5g-aka-confirmation response and the AuthCtxId ticket should be lower than the configured delay.

Figure 15:
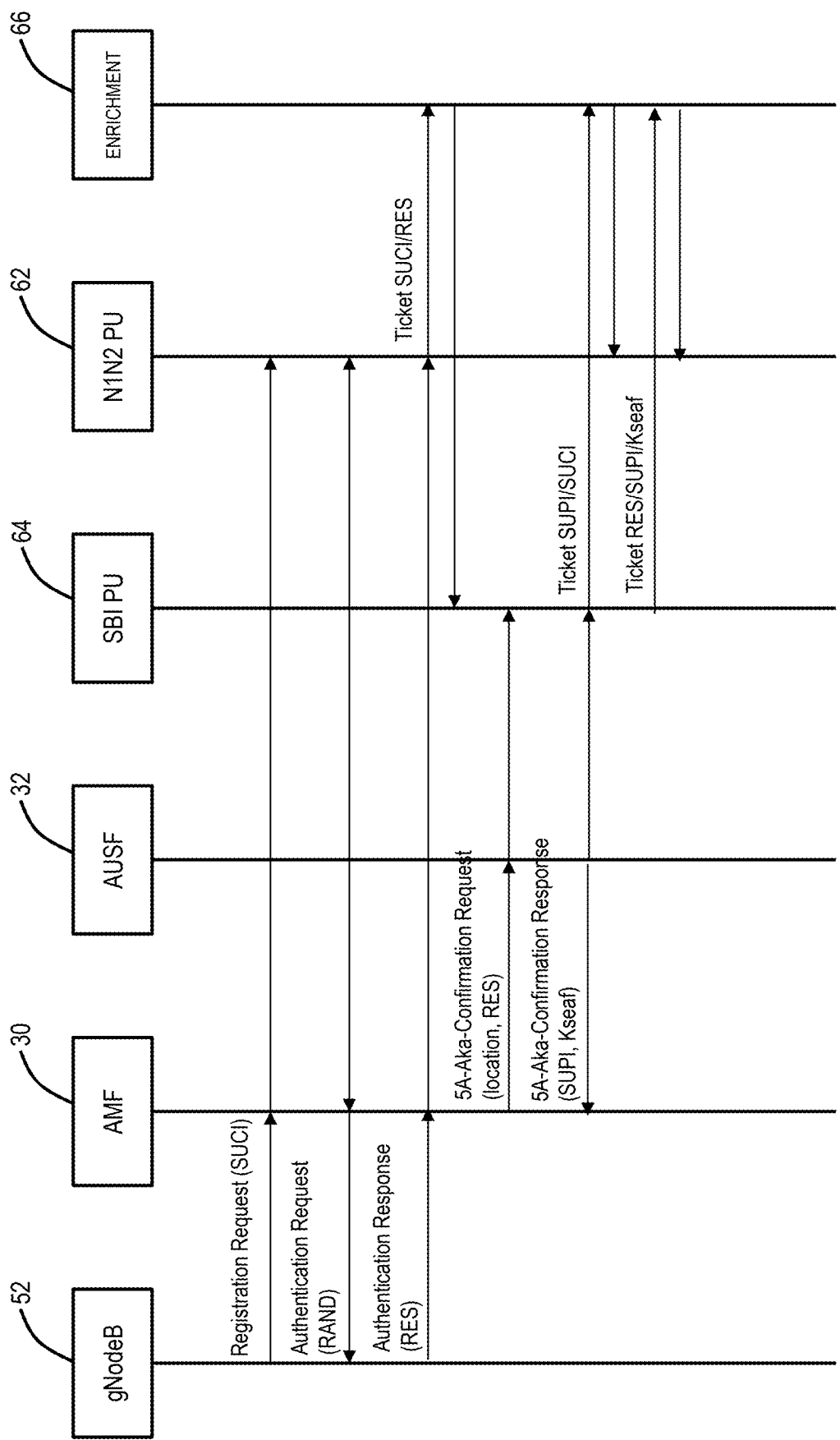

FIG. 15 is a fourth example embodiment of associating SUPIs and SUCIs by a correlation between N1N2 and SBI based on RES. The N1N2 correlation key to link uplink messages in N1N2 uses the RAN-UE-NGAP-ID+SCTP Port+SCTP Verification Tag. The Registration Request message in N1N2 contains the SUCI in the Mobile Identity field. The N1N2 PU extracts it and indexes it with the N1N2 Correlation Key. The Authentication Response contains the RES generated by the UE. The N1N2 PU uses the N1N2 correlation key to get the SUCI and then generates a ticket with the SUCI and the RES. In 5g-aka-confirmation Request message contains the same RES in the member "resStar" in the JSON object embedded in the body. The SBI PU extract the Res and associate it with the Request Correlation key. When the SBI PU receives the 5g-aka-confirmation response, it uses the Response correlation key to get the RES and extracts the SUPI. Then it waits during several milliseconds (this delay is configurable) to allow RES ticket to arrive. After this wait, the SBI PU searches for the SUCI associated with the RES. Finally, it associates the SUCI with the SUPI and generates an enrichment ticket. The capture point is at the AMF not in the 5G Core. There is only one message to process in SBI (5G-Aka-Confirmation response). There are only two messages to process in N1N2 (Registration Request and Authentication Response). Its limitations include: there is a correlation between two interfaces which could cause synchronization issues. The delay between the 5g-aka-confirmation response and the RES ticket should be lower than the configured delay.

UDM Embodiment

Figure 16:
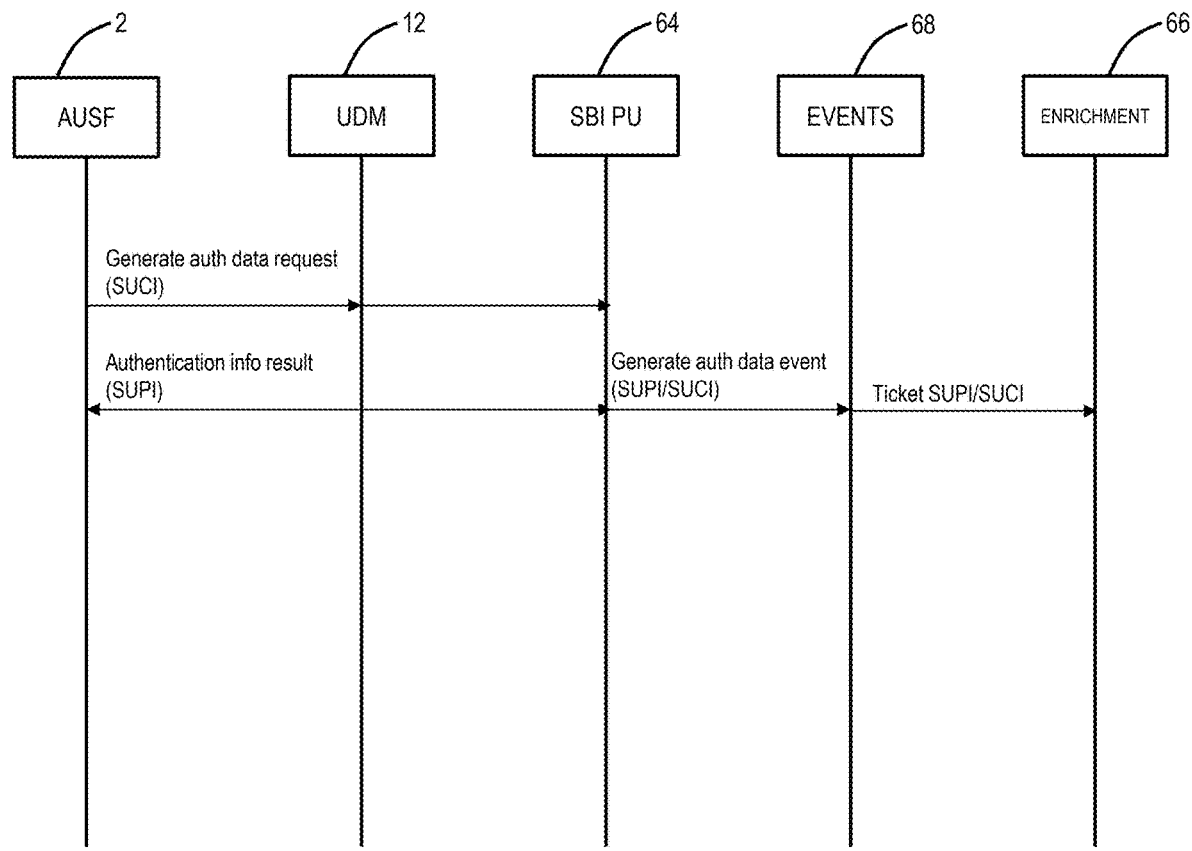
FIG. 16 is a flow diagram of an example approach for associating SUPIs and SUCIs, implementing based on AUSF to UDM communications.

FIG. 16 is a flow diagram of an example approach for associating SU PIs and SUCIs, implementing based on AUSF to UDM communications. The foregoing examples described an AMF 30 based embodiment. Those skilled in the art will recognize there can be embodiments located in other areas, such as the UDM 12. It is possible to capture AUSF to UDM communication, using the 3GPP specifications.

SUPI-SUCI Association Process

Figure 17:
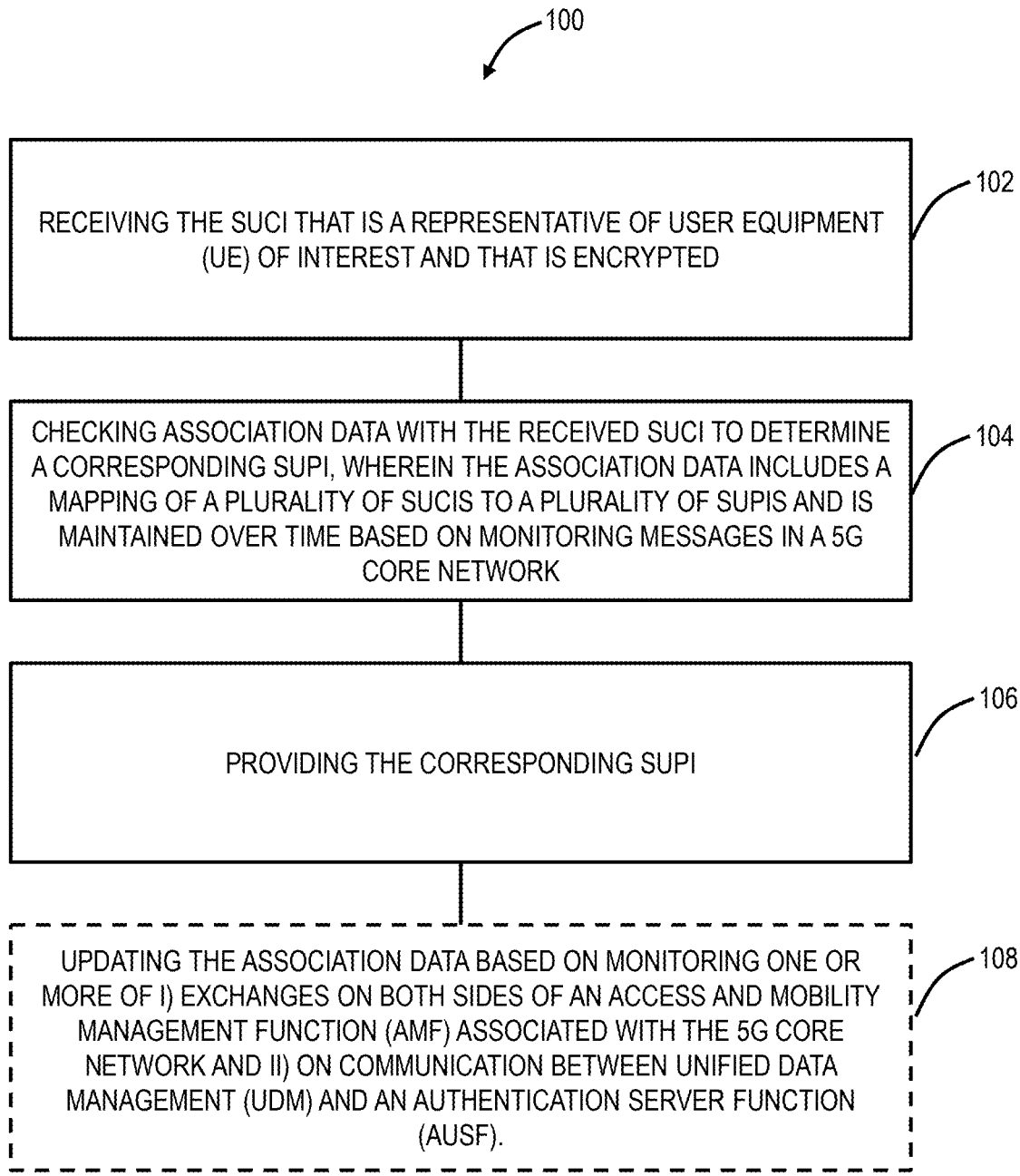
FIG. 17 is a flowchart of a process for detecting a subscriber permanent identifier (SUPI) from a subscriber concealed identifier (SUCI).

FIG. 17 is a flowchart of a process 100 for detecting a subscriber permanent identifier (SUPI) from a subscriber concealed identifier (SUCI). The process 100 contemplates implementation as a method having steps, via a processing device, the cloud, virtual network functions, and the like, and as instructions stored in a non-transitory computer-readable medium where the instructions, when executed, cause one or more processors to implement the steps.

The process 100 includes receiving the SUCI that is a representative of user equipment (UE) of interest and that is encrypted (step 102); checking association data with the received SUCI to determine a corresponding SUPI, wherein the association data includes a mapping of a plurality of SUCIs to a plurality of SUPIs and is maintained over time based on monitoring messages in a 5G core network (step 104); and providing the corresponding SUPI (step 106).

The process 100 can further include updating the association data based on monitoring one or more of i) exchanges on both sides of an access and mobility management function (AMF) associated with the 5G core network and ii) on communication between unified data management (UDM) and an authentication server function (AUSF) (108). A SUCI changes for a corresponding SUPI based on any changes in associated encryption.

The monitoring exchanges can be via a probe that captures data on the both sides of the AMF and via identifying specific messages on a message bus configured to receive the exchanges from the probe. The monitoring exchanges can include capturing raw frames, stream processing the raw frames, and identifying events via the stream processing. The monitoring exchanges can include identifying the mapping based on correlating a hypertext transfer protocol 2 (HTTP/2) request and response. The monitoring exchanges can include identifying the mapping based on a presence of a specific key in a response.

The monitoring exchanges can include monitoring events in a stream processing system connected to one or more probes in the 5G core network. The updating can be based on enrichment events caused in the stream processing system based on correlation of tickets therein.

The receiving can be via catcher equipment that is configured as a base station interfacing with a 5G network associated with the 5G core network.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method for detecting a subscriber permanent identifier (SUPI) from a subscriber concealed identifier (SUCI), the method comprising steps of:

receiving, via a SUPI catcher configured as a fake base station attached to a 5G core network and interfacing with an Access and Mobility Management Function (AMF) of an operator, the SUCI that is a representative of user equipment (UE) of interest and that is encrypted;

checking association data with the received SUCI to determine a corresponding SUPI, wherein the association data includes a mapping of a plurality of SUCIs to a plurality of SUPIs and is maintained over time based on monitoring messages in the 5G core network;

performing data enrichment within the SUPI catcher configured as fake base station to continually maintain association between the plurality of SUCIs and corresponding SUPIS over time; and providing the corresponding SUPI.

2. The method of claim 1, wherein the steps further include:

updating the association data based on monitoring one or more of i) exchanges on both sides of an access and mobility management function (AMF) associated with the 5G core network and ii) on communication between unified data management (UDM) and an authentication server function (AUSF), and wherein the updating includes updating a matrix that associates each of a plurality of SUCIs with a relevant SUPI.

3. The method of claim 2, wherein a SUCI changes for a corresponding SUPI based on any changes in associated encryption.

4. The method of claim 2, wherein the monitoring exchanges is via an enrichment mechanism of the SUPI catcher adapted to intercept the SUCI received from the UE and monitor cross signaling on both sides of the AMF.

5. The method of claim 2, wherein the monitoring exchanges includes capturing raw frames, stream processing the raw frames, and identifying events via the stream processing.

6. The method of claim 2, wherein the monitoring exchanges includes frames from the 5G core network, stream processing the raw frames to identity events, and correlating hypertext transfer protocol 2 (HTTP/2) request and response to identify a mapping between the SUCI and SUPI.

7. The method of claim 2, wherein the monitoring exchanges includes identifying the mapping based on a presence of a specific key in a response.

8. The method of claim 2, wherein the monitoring exchanges includes monitoring events in a stream processing system connected to one or more probes in the 5G core network.

9. The method of claim 8, wherein the updating is based on enrichment events caused in the stream processing system based on correlation of tickets therein.

10. A non-transitory computer-readable medium comprising instructions that, when executed, cause one or more processors to perform steps for detecting a subscriber permanent identifier (SUPI) from a subscriber concealed identifier (SUCI), the steps comprising:
    receiving, via a SUPI catcher configured as a fake base station at attached to a 5G core network and interfacing with an Access and Mobility Management Function (AMF) of an operator, the SUCI that is a representative of user equipment (UE) of interest and that is encrypted;
    checking association data with the received SUCI to determine a corresponding SUPI, wherein the association data includes a mapping of a plurality of SUCIs to a plurality of SUPIs and is maintained over time based on monitoring messages in the 5G core network;
    performing data enrichment within the SUPI catcher configured as the fake base station to continually maintain association between the plurality of SUCIs and corresponding SUPIs over time; and
    providing the corresponding SUPI.

11. The non-transitory computer-readable medium of claim 10, wherein the steps further include:
    updating the association data based on monitoring one or more of i) exchanges on both sides of an access and mobility management function (AMF) associated with the 5G core network and ii) on communication between unified data management (UDM) and an authentication server function (AUSF), and wherein the updating includes updating a matrix that associates each of a plurality of SUCIs with a relevant SUPI.

12. The non-transitory computer-readable medium of claim 11, wherein a SUCI changes for a corresponding SUPI based on any changes in associated encryption.

13. The non-transitory computer-readable medium of claim 11, wherein the monitoring exchanges is via an enrichment mechanism of the SUPI catcher adapted to intercept the SUCI received from the UE and monitor cross signaling on both sides of the AMF.

14. The non-transitory computer-readable medium of claim 11, wherein the monitoring exchanges includes capturing raw frames, stream processing the raw frames, and identifying events via the stream processing.

15. The non-transitory computer-readable medium of claim 11, wherein the monitoring exchanges includes capturing raw frames from the 5G core network, stream processing the raw frames to identify events, and correlating hypertext transfer protocol 2 (HTTP/2) request and response to identify a mapping between the SUCI and SUPI.

16. The non-transitory computer-readable medium of claim 11, wherein the monitoring exchanges includes identifying the mapping based on a presence of a specific key in a response.

17. The non-transitory computer-readable medium of claim 11, wherein the monitoring exchanges includes monitoring events in a stream processing system connected to one or more probes in the 5G core network.

18. The non-transitory computer-readable medium of claim 17, wherein the updating is based on enrichment events caused in the stream processing system based on correlation of tickets therein.

* * * * *